United States Patent
Kitayama et al.

(10) Patent No.: US 8,982,537 B2
(45) Date of Patent: Mar. 17, 2015

(54) SOLID ELECTROLYTE CAPACITOR AND METHOD FOR MANUFACTURING THE SAME

(75) Inventors: Hiroki Kitayama, Nagaokakyo (JP); Akio Katsube, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 134 days.

(21) Appl. No.: 13/597,810

(22) Filed: Aug. 29, 2012

(65) Prior Publication Data

US 2013/0100586 A1 Apr. 25, 2013

(30) Foreign Application Priority Data

Oct. 21, 2011 (JP) .................. 2011-231291

(51) Int. Cl.
*H01G 9/00* (2006.01)
*H01G 9/012* (2006.01)
*H01G 9/14* (2006.01)
*H01G 9/15* (2006.01)

(52) U.S. Cl.
CPC .............. *H01G 9/012* (2013.01); *H01G 9/14* (2013.01); *H01G 9/15* (2013.01)
USPC .......................................... 361/541; 361/523

(58) Field of Classification Search
USPC .................................................. 361/523, 541
See application file for complete search history.

(56) References Cited

U.S. PATENT DOCUMENTS

| | | | | |
|---|---|---|---|---|
| 5,377,073 A | * | 12/1994 | Fukaumi et al. | 361/540 |
| 8,164,883 B2 | * | 4/2012 | Chiu et al. | 361/523 |
| 2004/0027789 A1 | * | 2/2004 | Kochi et al. | 361/523 |
| 2007/0022590 A1 | * | 2/2007 | Hirano et al. | 29/25.03 |
| 2009/0073638 A1 | * | 3/2009 | Fujii et al. | 361/523 |

FOREIGN PATENT DOCUMENTS

WO WO-2006129639 12/2006

* cited by examiner

*Primary Examiner* — Dion R Ferguson
(74) *Attorney, Agent, or Firm* — Dickstein Shapiro LLP (57) ABSTRACT

In a solid electrolytic capacitor, resistance welding is carried out to bond a valve metal substrate and a spacer together while controlling a welding current so that only a bonding material provided in spacers and having a relatively low melting point is melted. At least a portion of the bonding material provided in the spacer penetrates an etching part of the valve metal substrate, and thickness Ta of a core part located at a positive electrode part in the valve metal substrate and thickness Tc of the core part located at a negative electrode part satisfy the requirement of $|Tc-Ta|/Tc \times 100 \leq 10[\%]$.

5 Claims, 6 Drawing Sheets

SOLID ELECTROLYTE CAPACITOR AND METHOD FOR MANUFACTURING THE SAME

FIELD OF THE INVENTION

The present invention relates to a solid electrolytic capacitor and a method for manufacturing the same, and particularly relates to a solid electrolytic capacitor in which a plurality of valve metal substrates are stacked to form a laminate, and a method for manufacturing the same.

DESCRIPTION OF THE RELATED ART

A solid electrolytic capacitor interesting for the present invention is described in, for example, International Publication WO 2006/129639 (International Publication WO 2006/129639). The solid electrolytic capacitor described in International Publication WO 2006/129639 includes a laminate constituted by stacking a plurality of valve metal substrates each having a core part and an etching part formed along the surface of the core part, and giving a positive electrode part and a negative electrode part.

A dielectric film is formed on the surface of each valve metal substrate, and in the negative electrode part of the valve metal substrate, a negative electrode layer is formed on the dielectric film, and a negative electrode external terminal is connected to the negative electrode layer. The negative electrode layer includes a conductive polymer layer, a carbon paste layer formed thereon and a silver paste layer formed thereon, and the conductive polymer layer, the carbon paste layer and the silver paste layer are formed by dipping in a respective liquid or pasty raw material solution a valve metal substrate provided with a dielectric film.

On the other hand, positive electrode parts of a plurality of valve metal substrates are integrated so as to gather at one location, and connected to positive electrode external terminals. Here, the negative electrode layer described above is not present on the positive electrode part of the valve metal substrate, and therefore if positive electrode parts of a plurality of valve metal substrates are integrated so as to gather at one location, each end part forming the positive electrode part of the valve metal substrate is bent at a degree corresponding to the thickness of the negative electrode layer, but in the solid electrolytic capacitor described in International Publication WO 2006/129639, a spacer capable of compensating for the thickness of the negative electrode layer is inserted between adjacent end parts of positive electrode parts of a plurality of valve metal substrates.

The spacer acts to reduce the bend of the valve metal substrate to a minimum to solve such a problem that this bend causes undesired stresses on the negative electrode layer on the negative electrode part adjacent to the positive electrode part.

International Publication WO 2006/129639 describes that the spacer is preferably bonded to the valve metal substrate by resistance welding. For facilitating such resistance welding, the spacer is made of, for example, copper or a copper alloy, and is provided on its surface with a bonding material having a relatively low melting point, which is made of, for example, tin or a tin alloy.

Figure 8A:
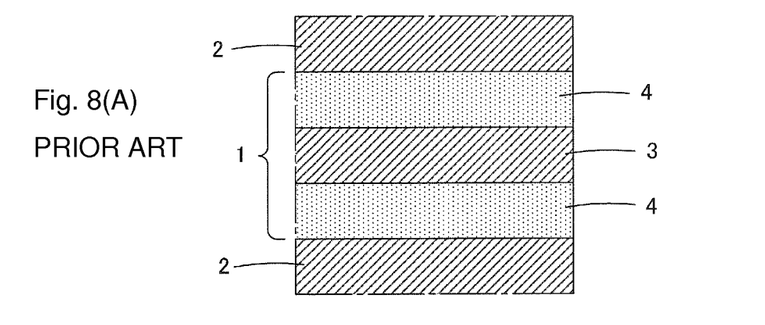
Figure 8B:
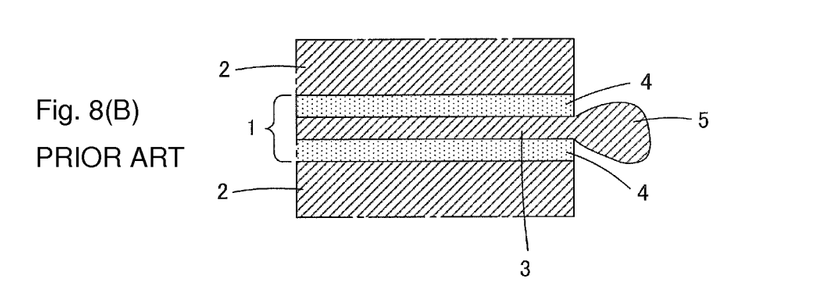

However, when the resistance welding is carried out, the problem shown in FIGS. 8(A) and 8(B) may arise. FIGS. 8(A) and 8(B) are views showing the positive electrode part side of one valve metal substrate 1, and shows particularly a section where a spacer 2 is placed on each of both the main surfaces thereof. FIG. 8(A) shows a state before resistance welding, and FIG. 8(B) shows a state after resistance welding.

The valve metal substrate 1 has a core part 3 and an etching part 4 formed along the surface of the core part 3. The surface of the spacer 2 is provided with a bonding material having a relatively low material, but the bonding material is not shown in the figure.

When the spacer 2 is superimposed on the positive electrode part of the valve metal substrate 1 as shown in FIG. 8(A), and resistance welding is carried out, the core part 3 of the valve metal substrate 1 may liquate out as shown in FIG. 8(B) depending on conditions for resistance welding because a heavy current passes in resistance welding, resulting in a reduction in bonding strength between the valve metal substrate 1 and the spacer 2 or a reduction in strength of the valve metal substrate 1 itself.

FIG. 8(B) illustrates a splash 5 generated by liquation of the core part 3, and also illustrates a situation in which the core part 3 has a reduced thickness as compared to the thickness before welding shown in FIG. 8(A). In an extreme case, the core part 3 may disappear after welding. Particularly, as the number of valve metal substrates 1 that are stacked is becomes larger, a current in resistance welding increases, and therefore this problem becomes more significant.

SUMMARY OF THE INVENTION

Thus, an object of the present invention is to provide a solid electrolytic capacitor which can solve the above-mentioned problems, namely a solid electrolytic capacitor in which a core part of a valve metal substrate does not liquate out, and bonding is provided between the valve metal substrate and a spacer with sufficient strength.

Another object of the present invention is to provide a method for manufacturing a solid electrolytic capacitor, wherein when a valve metal substrate and a spacer are bonded by resistance welding, control is performed so that a core part of the valve metal substrate does not liquate out.

The present invention is first directed to a solid electrolytic capacitor including: a plurality of valve metal substrates each having a core part and an etching part formed along the surface of the core part, and giving a positive electrode part and a negative electrode part; a dielectric film formed at least on the negative electrode part of each valve metal substrate; and a negative electrode layer formed on the dielectric film in the negative electrode part of each valve metal substrate, wherein the plurality of valve metal substrates are stacked to form a laminate, and in the laminate, a spacer provided on the surface with a bonding material is interposed between the positive electrode parts of the valve metal substrates. For solving the problems described above, the solid electrolytic capacitor has the following configuration.

That is, the solid electrolytic capacitor according to the present invention is characterized in that thickness Ta of a core part located at the positive electrode part in the valve metal substrate and thickness Tc of a core part located at the negative electrode part satisfy the requirement of $|Tc-Ta|/Tc \times 100 \leq 10[\%]$, and at least a portion of the bonding material provided in the spacer penetrates the etching part of the valve metal substrate.

In the solid electrolytic capacitor according to the present invention, the melting point of the bonding material provided in the spacer is preferably lower than the melting point of the valve metal substrate. Consequently the bonding material provided in the spacer more easily penetrates the etching part of the valve metal substrate, and consequently bondability between the valve metal substrate and the spacer can be further improved.

The present invention is also directed to a method for manufacturing a solid electrolytic capacitor.

In the method for manufacturing a solid electrolytic capacitor according to the present invention, a plurality of valve metal substrates each having a core part and an etching part formed along the surface of the core part, and giving a positive electrode part and a negative electrode part are first prepared, a bonding material is provided on the surface, and a spacer having a melting point higher than the melting point of the valve metal substrate is prepared.

Then, a step of forming a dielectric film at least on the surface of the negative electrode part of the valve metal substrate, a step of forming a negative electrode layer on the dielectric film in the negative electrode part of each valve metal substrate and a step of stacking the plurality of valve metal substrates with the spacer interposed between the positive electrode parts of the valve metal substrates are carried out.

Then, for obtaining a laminate in which a plurality of valve metal substrates are stacked, a step of performing resistance welding to bond the valve metal substrate and the spacer, and in the resistance welding step, a welding current is controlled so that only the bonding material provided in the spacer is melted.

In a preferred embodiment of the present invention, the valve metal substrate is made of aluminum or an alloy having aluminum as a main component, the bonding material is made of tin or an alloy having tin as a main component, and the spacer is made of copper or an alloy having copper as a main component. According to the preferred embodiment, a solid electrolytic capacitor can be provided at a low cost, a high dielectric constant can be achieved in the valve metal substrate and the spacer, the handling characteristic of the valve metal substrate can be made satisfactory, and a difference of 400° C. or more in melting point can be provided between the valve metal substrate and the bonding material, and therefore, melting of only the bonding material can reliably achieved in the resistance melting step.

According to the present invention, when a spacer is bonded to a positive electrode part of a valve metal substrate, liquation of a core part of the valve metal substrate can be prevented. The melted bonding material can penetrate an etching part of the valve metal substrate to exhibit an anchor effect. Consequently, the bonding strength between the valve metal substrate and the spacer can be improved while suppressing a reduction in bonding strength of the valve metal substrate itself.

BRIEF DESCRIPTION OF THE DRAWINGS

FIGS. 8(A) and 8(B) are views showing the positive electrode part side of one valve metal substrate 1 for explaining the problems to be solved by the present invention, wherein FIG. 8(A) shows a state before resistance welding, and FIG. 8(B) shows a state after resistance welding.

DETAILED DESCRIPTION OF THE INVENTION

A solid electrolytic capacitor 11 according to one embodiment of the present invention will be described with reference to FIGS. 1 to 3.

Figure 1:
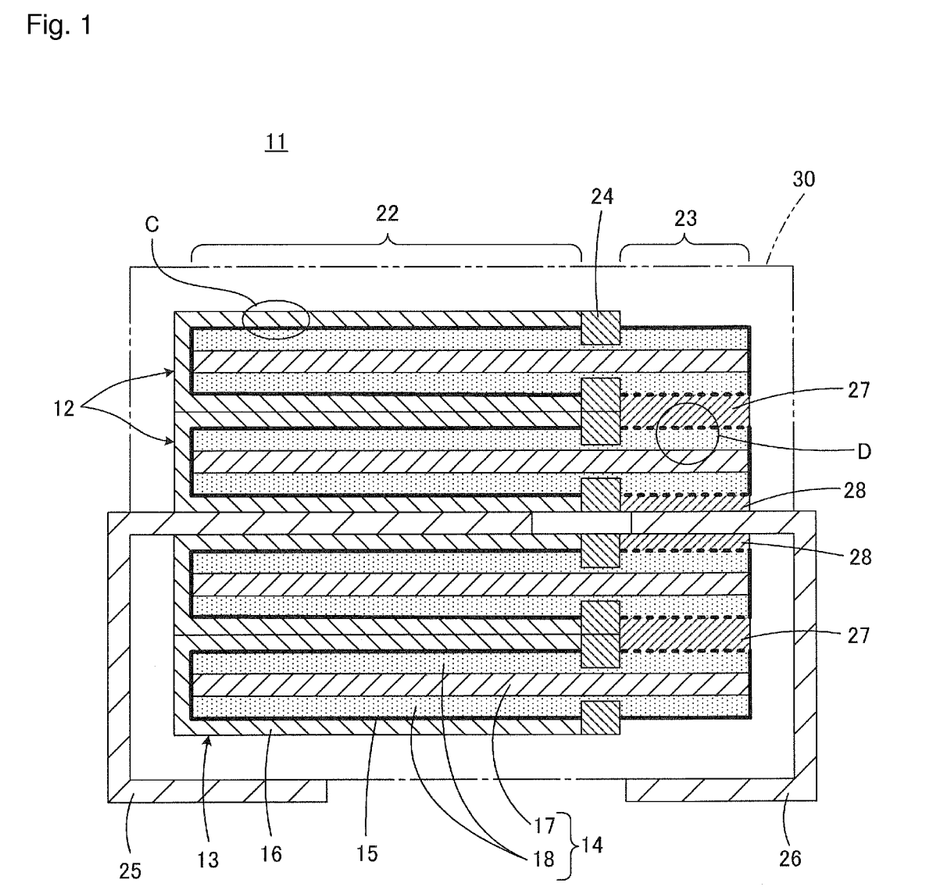
FIG. 1 is a cross-sectional view showing a solid electrolytic capacitor 11 according to an embodiment of the present invention.

As shown in FIG. 1, the solid electrolytic capacitor 11 includes a laminate 13 constituted by stacking, for example, 4 capacitor units 12. The configurations of these 4 capacitor units 12 are common.

Each capacitor unit 12 includes a valve metal substrate 14, a dielectric film 15 (shown by a bold line in FIG. 1) formed on the surface of the valve metal substrate 14, and a negative electrode layer 16 formed on the dielectric film 15.

The valve metal substrate 14 is made of, for example, aluminum, tantalum or niobium, but is preferably made of aluminum or an alloy having aluminum as a main component. As one example, the valve metal substrate 14 is made of an aluminum foil, and is subjected to an etching treatment to thereby roughen the surface, and consequently has a core part 17 and an etching part 18 formed along the surface thereof. The dielectric film 15 is formed by, for example, oxidizing the surface of the valve metal substrate 14.

Figure 2:
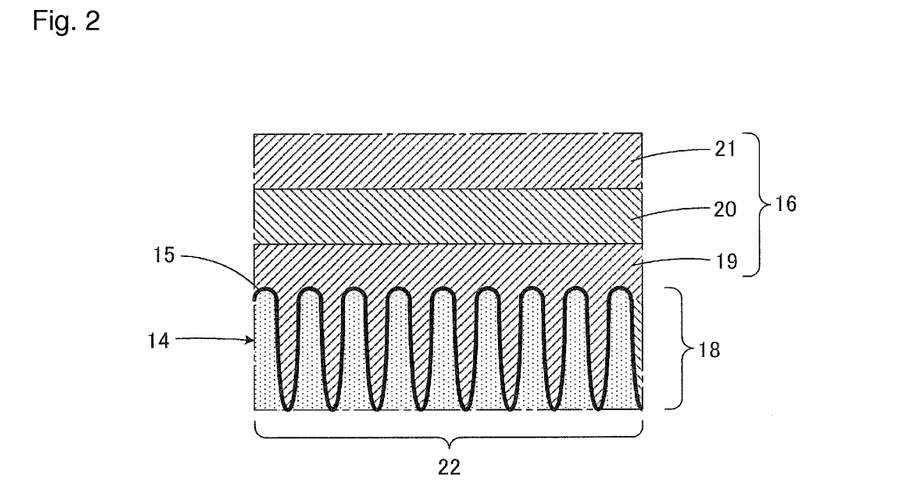
FIG. 2 is a cross-sectional view showing section C of FIG. 1.

The negative electrode layer 16 includes a conductive polymer layer 19, a carbon paste layer 20 thereon and a silver paste layer 21 thereon as shown in FIG. 2. These layers 19 to 21 are formed by adding respective corresponding raw material solutions as described in detail later.

Figure 3:
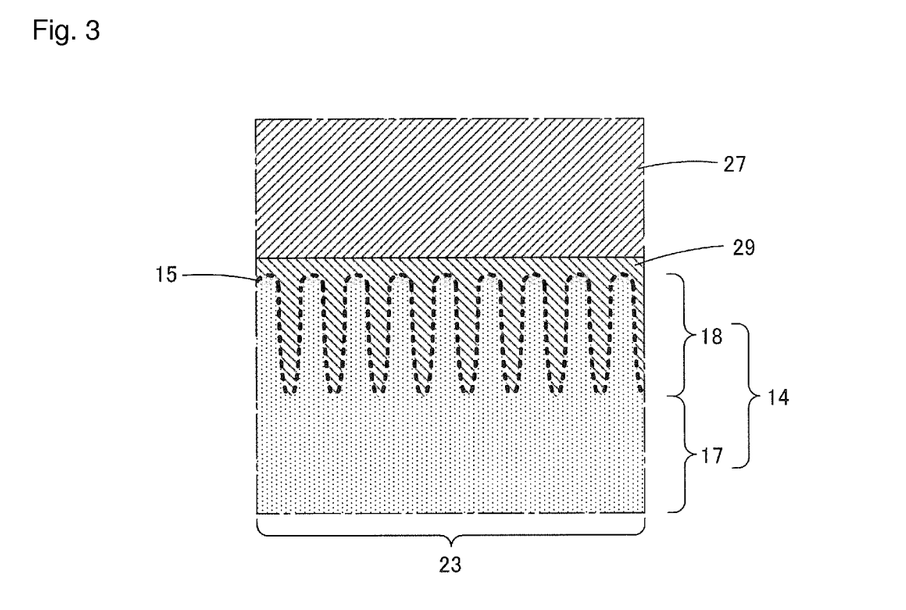
FIG. 3 is a cross-sectional view showing section D of FIG. 1.

In FIGS. 2 and 3, the etching part 18 of the valve metal substrate 14 is shown by a wavy line, and this schematically illustrates the etching part 18. In reality, the etching part 18 has a more complicated surface pattern.

The valve metal substrate 14 gives a negative electrode part 22 in a section where the negative electrode layer 16 is formed, and gives a positive electrode part 23 in a section where the negative electrode layer 16 is not formed.

A barrier member 24 is provided at a boundary between the negative electrode part 22 and the positive electrode part 23 of the valve metal substrate 14. The barrier member 24 is intended to provide a barrier so that a negative electrode raw material solution added for forming the negative electrode layer 16 does not enter the positive electrode part 23. The barrier member 24 is made of an electrically insulating resin, and is placed with a portion thereof embedded in or penetrating the etching part 18 of the valve metal substrate 14.

A negative electrode external terminal 25 and a positive electrode external terminal 26 are placed between certain capacitor units 12, and drawn to outside. The negative electrode external terminal 25 is connected to the silver paste layer 21 in the negative electrode layer 16 via, for example, a conductive adhesive (not shown). Negative electrode layers 16 in mutually adjacent capacitor units 12 are also connected via, for example, a conductive adhesive (not shown) as required.

In the laminate 13, a spacer 27 or 28 is interposed between positive electrode parts 23 of valve metal substrates 14. The spacer 28 is provided so as to hold the positive electrode external terminal 26, and has a thickness dimension smaller than that of the spacer 27. Instead of using properly two kinds of spacers 27 and 28 having mutually different thickness dimensions in this manner, only one kind of spacer having a common thickness dimension, such as, for example, only the spacer 27 having a relatively large thickness dimension, may be used.

Spacers 27 and 28 are preferably made of copper or an alloy having copper as a main component, and the surfaces thereof are provided with a bonding material 29 as shown in FIG. 3. The bonding material 29 is preferably made of tin or an alloy having tin as a main component, and the melting point thereof is understandably lower than the melting points of spacers 27 and 28, and is also lower than the melting point of the valve metal substrate 14. The bonding material 29 is provided on the surfaces of spacers 27 and 28 by, for example, plating tin.

The valve metal substrate 14, spacers 27 and 28, and the positive electrode external terminal 26 are bonded together by resistance welding. In the resistance welding, the bonding material 29 provided on the surfaces of spacers 27 and 28 is melted and penetrate the etching part 18 of the valve metal substrate 14. The dielectric film 15 is also formed on the surface of the positive electrode part 23 of the valve metal substrate 14, but when resistance welding is carried out, the melted bonding material 29 can break through the dielectric film 15 owing to a load at the time of welding and penetrate the etching part 18. For schematically illustrating this, the broken-though dielectric film 15 is shown by dashed lines in FIGS. 1 and 3.

Although not clearly shown in FIG. 1, if the bonding material 29 and the core part 17 of the valve metal substrate 14 are in contact with each other as shown in FIG. 3, the bonding strength between the bonding material 29 and the valve metal substrate 14 can be further improved.

The solid electrolytic capacitor 11 also includes an exterior resin 30 (its outline is shown by an imaginary line in FIG. 1) made of, for example, epoxy resin, which is molded so as to cover the laminate 13.

A method for manufacturing the solid electrolyte capacitor 11 described above will now be described with reference principally to FIGS. 4 to 6.

Figure 4:
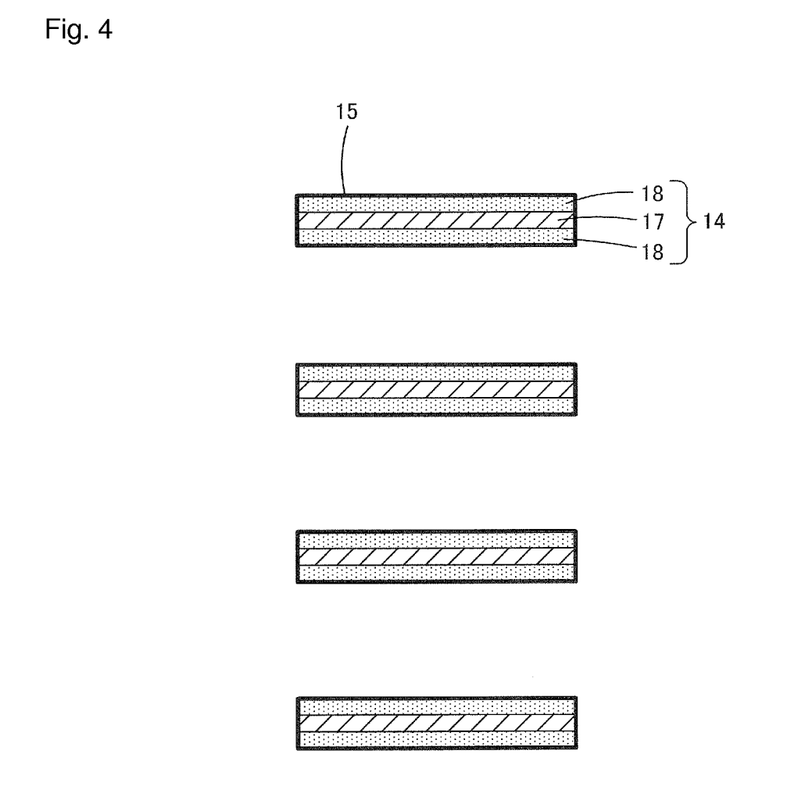
FIG. 4 is a cross-sectional view intended to explain a method for manufacturing the solid electrolytic capacitor 11 shown in FIG. 1 and showing a plurality of valve metal substrates 14.

First, a plurality of valve metal substrates 14 are prepared as shown in FIG. 4. The valve metal substrate 14 is made of, for example, an aluminum foil having a thickness of about 100 μm, and is subjected to an etching treatment to thereby roughen the surface, and consequently has a core part 17 and an etching part 18 formed along the surface thereof as described above. The surface of the valve metal substrate 14 is oxidized, and consequently a dielectric film 15 made of, for example, aluminum oxide is formed.

Figure 5:
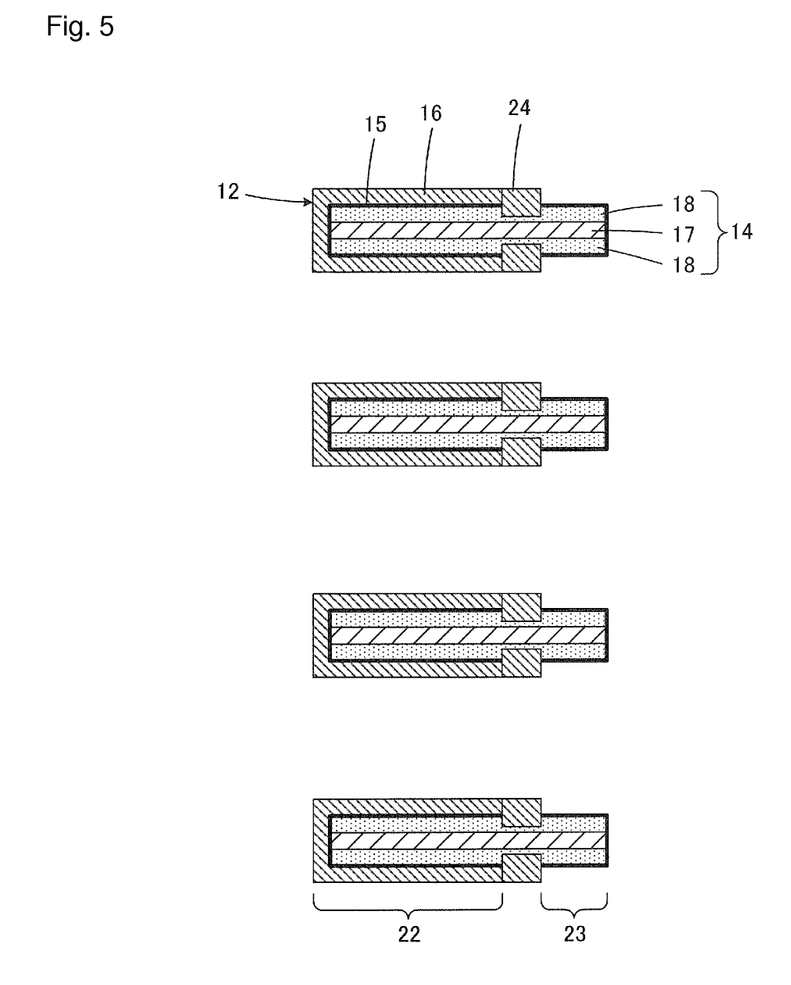
FIG. 5 is a cross-sectional view showing a state in which a negative electrode layer 16 is formed on the valve metal substrate 14 shown in FIG. 4.

Next, as shown in FIG. 5, a barrier member 24 is provided in the etching part 18 of the valve metal substrate 14. A portion of the barrier member 24 is embedded in or made to penetrate the etching part 18 as described above.

As shown likewise in FIG. 5, a negative electrode layer 16 is formed on the dielectric film 15 in a negative electrode part 22 of the valve metal substrate 14. The negative electrode layer 16 includes a conductive polymer layer 19, a carbon paste layer 20 thereon and a silver paste layer 21 thereon as described above with reference to FIG. 2.

First, the negative electrode part 22 of the valve metal substrate 14 is dipped in a conductive polymer raw material solution for forming the conductive polymer layer 19. At this time, a region, to which the conductive polymer raw material solution is added, is limited by the barrier member 24. Thereafter, the negative electrode part 22 of the valve metal substrate 14 is withdrawn from the conductive polymer raw material solution, and dried as required to thereby form the conductive polymer layer 19 on the negative electrode part 22 of the valve metal substrate 14.

For describing one example of a step of forming a conductive polymer layer below, an operation of dipping the negative electrode part 22 of the valve metal substrate 14 in an isopropanol solution containing 3,4-ethylenedioxythiophene as a conductive polymer raw material solution as described above, and then dipping the negative electrode part 22 in a mixed solution of ammonium persulfate and sodium anthraquinone disulfonate is repeated twenty times to thereby form a conductive polymer layer made of polyethylenedioxythiophene.

Next, the negative electrode part 22 of the valve metal substrate 14 provided with the conductive polymer layer 19 is dipped in a carbon paste. At this time, a region, to which the carbon paste is added, is limited by the barrier member 24. Thereafter, the negative electrode part 22 of the valve metal substrate 14 is withdrawn from the carbon paste, and dried as required to thereby form the carbon paste layer 20 on the conductive polymer layer 19.

Next, the negative electrode part 22 of the valve metal substrate 14 provided with the conductive polymer layer 19 and the carbon paste layer 20 is dipped in a silver paste. At this time, a region, to which the silver paste is added, is limited by the barrier member 24. Thereafter, the negative electrode part 22 of the valve metal substrate 14 is withdrawn from the silver paste, and dried as required to thereby form the silver paste layer 21 on the carbon paste layer 20.

The negative electrode layer 16 is thus formed on the dielectric film 15 in the negative electrode part 22 of the valve metal substrate 14 as shown in FIG. 5.

Figure 6:
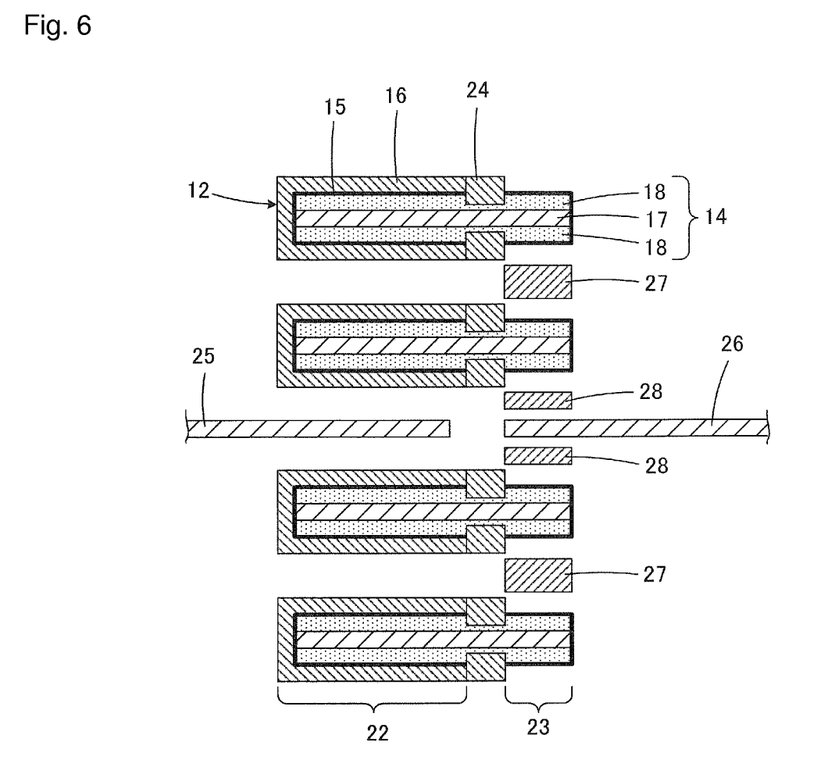
FIG. 6 is a cross-sectional view showing a step of stacking the valve metal substrates 14 shown in FIG. 5 together with spacers 27 and 28, a negative electrode external terminal 25 and a positive electrode external terminal 26.

Next, as shown in FIG. 6, a step of stacking a plurality of valve metal substrates 14 each provided with the negative electrode layer 16, namely a plurality of capacitor units 12, is carried out. For stacking a plurality of capacitor units 12, a negative electrode external terminal 25 is placed so as to be electrically connected to the negative electrode layer 16 between certain capacitor units 12, a spacer 27 or 28 is interposed between positive electrode parts 23 of valve metal substrates 14, and a positive electrode external terminal 26 is interposed between two spacers 28.

Next, for obtaining a laminate 13 in which a plurality of valve metal substrates 14, namely a plurality of capacitor units 12 are stacked, resistance welding is carried out for bonding the valve metal substrate 14 and spacers 27 and 28. In the resistance welding, a welding current is controlled so that only a bonding material 29 provided in spacers 27 and 28 (see FIG. 3) is melted. The positive electrode external terminal 26 also has a same structure as spacers 27 and 28, and is formed from, for example, a copper plate plated with tin. Therefore, resistance welding is also achieved between the positive electrode external terminal 26 and the spacer 28.

As a result of the resistance welding, at least a portion of the bonding material 29 provided in spacers 27 and 28 penetrates the etching part 18 of the valve metal substrate 14 as shown in FIG. 3 for the spacer 27.

Figure 7:
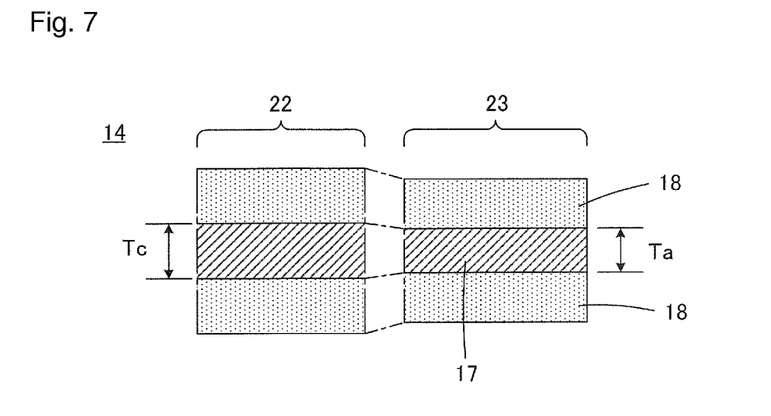
FIG. 7 is a cross-sectional view showing the thickness of a core part 17 of the valve metal substrate 14 after resistance welding with a comparison made between the thickness in a negative electrode part 22 and the thickness in a positive electrode part 23.

For providing an explanation with reference to FIG. 7, the welding current in the resistance welding is controlled thickness Ta of the core part 17 located at the positive electrode part 23 in the valve metal substrate 14 and thickness Tc of the core part 17 located at the negative electrode part 22 satisfies the requirement of $|Tc-Ta|/Tc \times 100 \leq 10[\%]$.

If the above-mentioned requirement is satisfied, liquation of the core part 17 in the positive electrode part 23 of the valve metal substrate 14 can be prevented at the time of resistance welding, and the melted bonding material 29 can penetrate the etching part 18 of the valve metal substrate 14 to exhibit an anchor effect. Consequently, the bonding strength can be improved between the valve metal substrate 14 and spacers 27 and 28 and the positive electrode external terminal 26.

It has been previously described that when resistance welding is carried out, the melted bonding material 29 breaks through the dielectric film 15 owing to a load at the time of welding and penetrates the etching part 18, but the dielectric film 15 may be formed only on the negative electrode part 22 of the valve metal substrate 14. Thus, the dielectric film 15 as an oxide film may be formed only on the negative electrode part 22 of the valve metal substrate 14 by subjecting the negative electrode part 22 of the valve metal substrate 14 to, for example, a positive electrode oxidation treatment after the barrier member 24 is provided in the valve metal substrate 14 and before the negative electrode layer 16 is formed as shown in FIG. 5.

Next, an exterior resin 30 is molded and the solid electrolytic capacitor 11 is completed.

Experimental examples will be described below which were carried out for confirming the advantageous effects of the present invention.

First, a plurality of valve metal substrates shown in FIG. 4 was prepared. The valve metal substrate was made of aluminum, had a core part and an etching part, and provided on the surface with a dielectric film made of aluminum oxide.

Next, as shown in FIG. 5, the valve metal substrate was provided on its surface with a barrier member, and thereby divided into a positive electrode part and a negative electrode part, and a negative electrode layer including a conductive polymer layer, a carbon paste layer and a silver paste layer were formed on the surface of the dielectric film of the negative electrode part. A plurality of capacitor units were thus obtained.

On the other hand, a spacer prepared using a copper plate plated with tin, and a negative electrode external terminal and a positive electrode external terminal were prepared.

Next, the capacitor unit, spacer, negative electrode external terminal and positive electrode terminal were stacked as shown in FIG. 6, and the positive electrode part of the valve metal substrate, the spacer and the positive electrode external terminal were then bonded together by resistance welding. In resistance welding, three conditions shown in Table 1 below were employed.

TABLE 1

| Conditions | Welding current | Time |
|---|---|---|
| 1 | 0.3 kA | 100 milliseconds |
| 2 | 0.4 kA | 100 milliseconds |
| 3 | 0.5 kA | 100 milliseconds |

These conditions were intended for lamination of 10 aluminum foils (melting point: 660° C.) with a spacer prepared by plating a copper plate with tin (melting point: 232° C.) and an external terminal.

Table 2 shows the temperature of a joint at the time of resistance welding, and the thickness of the core part of the valve metal substrate in each of the positive electrode part and the negative electrode part, and also shows the value of $|Tc-Ta|/Tc \times 100 [\%]$ as "difference in core thickness" where Ta is the thickness of the core in the positive electrode part and Tc is the thickness of the core in the negative electrode part.

TABLE 2

| | | Core thickness | | |
|---|---|---|---|---|
| Conditions | Joint temperature | Positive electrode part | Negative electrode part | Difference in core thickness |
| 1 | 408° C. | 29 μm | 30 μm | 3.3% |
| 2 | 656° C. | 28.5 μm | 31 μm | 8.1% |
| 3 | 854° C. | 5 μm | 30 μm | 83% |

As is apparent from Table 2, if the welding current is controlled to provide such a joint temperature that only tin as a bonding material is melted as in conditions 1 and 2, a decrease in thickness of the core part in the positive electrode part is kept low as compared to condition 3. From this, it is apparent that according to conditions 1 and 2, liquation of the core part of the valve metal substrate by resistance welding is prevented.

What is claimed is:

1. A solid electrolytic capacitor comprising:
    a plurality of valve metal substrates each having a core part and an etching part along the surface of the core part, and each of the plurality of valve metal substrates having a positive electrode part and a negative electrode part;
    a dielectric film at least on the negative electrode part of each of the plurality of valve metal substrates;
    a negative electrode layer on the dielectric film in the negative electrode part of each of the valve metal substrates;
    a resistance welded spacer bonded between the positive electrode parts of adjacent valve metal substrates of the plurality of valve metal substrates,
    wherein a thickness Ta of the core part in the positive electrode part of each of the valve metal substrates and a thickness Tc of the core part located in the negative electrode part satisfy the requirement of $|Tc-Ta|/Tc \times 100 \leq 10[\%]$ and $Tc > Ta$, and
    at least a portion of a bonding material adhering the spacer between the positive electrode parts of adjacent valve metal substrates of the plurality of valve metal substrates penetrates the etching parts of the adjacent valve metal substrates.

2. The solid electrolytic capacitor according to claim 1, wherein a melting point of the bonding material is lower than a melting point of the valve metal substrates.

3. The solid electrolytic capacitor according to claim 2, wherein the valve metal substrates are aluminum or an alloy having aluminum as a main component, the bonding material is tin or an alloy having tin as a main component, and the spacer is copper or an alloy having copper as a main component.

4. The solid electrolytic capacitor according to claim 1, further comprising a barrier member between the negative electrode part and the positive electrode part of each of the plurality of valve metal substrates.

5. The solid electrolytic capacitor according to claim 1, wherein the plurality of valve metal substrates are arranged in at least two capacitor units, and the solid electrolytic capacitor further comprises:
    a negative electrode terminal and a positive electrode terminal between the at least two capacitor units.

* * * * *